United States Patent [19]

Palomera

[11] Patent Number: 4,501,057
[45] Date of Patent: Feb. 26, 1985

[54] CARPENTER'S LEVEL HOLDING DEVICE AND METHOD FOR PLUMBING A WALL PARTITION

[76] Inventor: Louis M. Palomera, 4091 Manzanita, Irvine, Calif. 92714

[21] Appl. No.: 498,940

[22] Filed: May 27, 1983

[51] Int. Cl.³ .......................... B23P 19/04; G01C 9/00
[52] U.S. Cl. .......................................... 29/407; 33/371
[58] Field of Search ...................... 248/219.2, 214, 215, 248/217.1; 33/370, 371, 372, 373; 269/904, 43; 29/407

[56] References Cited

U.S. PATENT DOCUMENTS

| 2,777,210 | 1/1957 | Johnson et al. | 33/371 |
| 2,857,678 | 10/1958 | Armour | 33/343 |
| 3,230,632 | 1/1963 | Redding | 33/372 |
| 3,296,708 | 1/1967 | Moody | 33/371 |
| 4,108,413 | 8/1978 | Goserud | 248/214 |
| 4,274,208 | 6/1981 | Yakkel | 33/371 |

Primary Examiner—Howard N. Goldberg
Assistant Examiner—Steven E. Nichols
Attorney, Agent, or Firm—Hubbard & Stetina

[57] ABSTRACT

A carpenter's level holding device and method for plumbing a wall partition is disclosed, characterized by use of a bracket to hold a conventional carpenter's level to removably attach and self-register the level on a wall partition and a method providing for the positioning, plumbing, and securing of a wall partition by a single user. The bracket includes a first portion adapted to mount one end of the level and a second portion formed to be selectively rested upon the top of a wall partition to thereby hold the carpenter's level securely against and parallel to the vertical timbers of the wall partition with the bracket maintaining the carpenter's level in position upon the wall partition, an individual user has both hands free to properly plumb and temporarily secure the wall partition in place.

8 Claims, 3 Drawing Figures

CARPENTER'S LEVEL HOLDING DEVICE AND METHOD FOR PLUMBING A WALL PARTITION

BACKGROUND OF THE INVENTION

The present invention relates generally to a carpenter's level holder and, more particularly, to a carpenter's level holder device which subsequent to the placement of the level in the device, permits the device and level to be placed on a wall partition with automatic self-aligning and self-securing features for facilitating the plumbing of the wall partition by a single user.

In the construction of buildings or homes, there is a stage in the process wherein individual wall frames or partitions are erected and temporarily secured by a beam previously attached to the nearby floor and then secured by a nail to the partition. To accomplish this process, it heretofore has been customary for one person to hold a carpenter's level against a vertical position of the partition, then while holding the partition in the proper or plumb position, an additional person nails another member or beam in place to temporarily secure the partition's proper vertical position. As will be recognized, the prior art's use of two persons to properly position the partition upon the job site has necessarily increased overall labor costs for the resultant structure.

In the prior art, it has been shown that it is possible to construct a leveling device which may be temporarily attached to a wall, thereby freeing the user's hands. Such an attempted solution is taught by, for example, in Armour (U.S. Pat. No. 2,857,678) and Cusick (U.S. Pat. No. 1,308,699). These attempted solutions however were designed for use by brick masons on a wall already partially constructed to only assist in the alignment of subsequent bricks being laid and is thus, completely inapplicable to the plumbing of wooden partition walls which are yet unsecured. Also, these prior art devices usually require the fabrication of a complete unit including a level and a securing device, making the unit expensive to fabricate and generally requiring that the device be manually clamped and unclamped on the wall for each use.

Another attempted solution to the problem has been suggested by Manville (U.S. Pat. No. 3,311,988) in which a device is disclosed including a specially fabricated level and a straight edge combination and a clamp by which the level and straight edge may be attached to a structural member of a wall partition. Unfortunately, this Manville device does not provide for the use of a standard carpenter's level which may be easily removed, requires special fabrication of both the level and a straight edge in addition to the clamp itself, employs a clamping device which will not accomodate the width of a conventional 2×4 timber and requires clamping and unclamping with each use. Further, this device is not designed for inexpensive fabrication or for ease of use. A similar device as taught by Redding (U.S. Pat. No. 3,230,632) also requires a special level to be used and is not designed to be inexpensively fabricated. Also, when the Redding device is used for plumbing a wall partition, it must be placed on the construction member facing toward the user and at eye level which would apparently interfere with the positioning and nailing of the stabilizing member.

Thus, in summary, the prior art devices disclosed for the attempted solution of a single person being able to position and plumb a wall partition generally require special fabrication of a level and holder combination, clamping and unclamping with each use, and are not designed to be inexpensively manufactured.

SUMMARY OF THE INVENTION

The present invention specifically addresses and alleviates the deficiencies associated in the prior art by providing a simply constructed carpenter's level holder or bracket which permits a conventional carpenter's level to be inserted and secured in the holder before the device is used. Therefore, should the level become broken or uncalibrated, it can be easily replaced without interfering with the function of the device.

Unlike the prior art, the present invention is of a simple, single piece construction requiring no adjustments. The nature of the design of the invention with the level in place, provides for automatic self-positioning and self-securing of the level on the wall partition when placed on the header of the partition. Thus, no adjustments are necessary prior to use, nor is it necessary that the device be clamped to the wall partition before it can be used.

With the level secured in place upon the holder, the user can raise the wall partition upright, place the holder and level on the header of the partition with one hand, and with both hands now free, align and secure the wall partition.

DESCRIPTION OF THE DRAWINGS

These as well as other advantages of the present invention are best understood through a reference to the drawings, in which.

DETAILED DESCRIPTION OF THE PREFERRED EMBODIMENT

Figure 1:
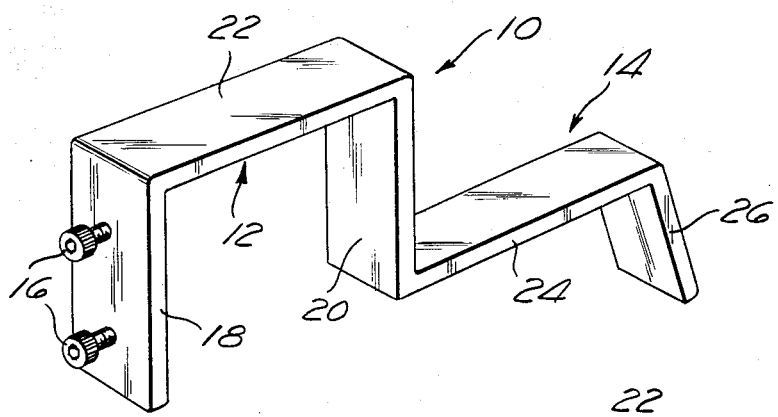
FIG. 1 is a perspective view of the carpenter's level holder which is constructed in accordance with the present invention.

Referring to FIG. 1, the carpenter's level holder 10 of the present invention is shown, preferably constructed as a single, ridid unit, composed of a generally U-shaped portion 12 and a generally L-shaped portion 14. A pair of set screws 16 are threadingly inserted into mating tapped holes formed in the U-shaped portion 12 and as will be explained in more detail infra are used to secure the carpenter's level in place upon the holder 10.

In the preferred embodiment, the U-shaped portion 12 is designed such that one end of a standard carpenter's level 28 can be inserted and then secured therein by the set screws 16; with the set screws 16 further serving to accomodate variations in the width of the particular carpenter's level to be used. The two sides or legs 18 and 20 of the U-shaped portion 12 are parallel to one another and disposed at right angles to the top leg 22 of the U-shaped member 12. This assures that the carpenter's level 28 can be securely and reproducibly positioned in the right angle formed between the side 20 and top 22 of the U-shaped portion 12, and firmly abutted against and maintained parallel to the side 20 of the U-shaped portion 12. In this way, the carpenter's level 28 becomes an integral part of the present invention, contributing to the automatic positioning and attachment of the present invention to the partition, as described below.

The L-shaped portion 14 of the carpenter's level holder 10 is composed of two sides or legs 24 and 26. The longer leg 24 is disposed at a right angle to the adjacent side 20 of the U-shaped portion 12 while the two legs 24 and 26 of the L-shaped member 14 are oriented relative each other such that the angle formed therebetween is preferably greater than 90 degrees. This construction contributes to the automatic positioning of the carpenter's level holder 10 on standard 2×4 timber headers which typically have variations in their width, without requiring adjustment of the carpenter's level holder 10.

Figure 2:
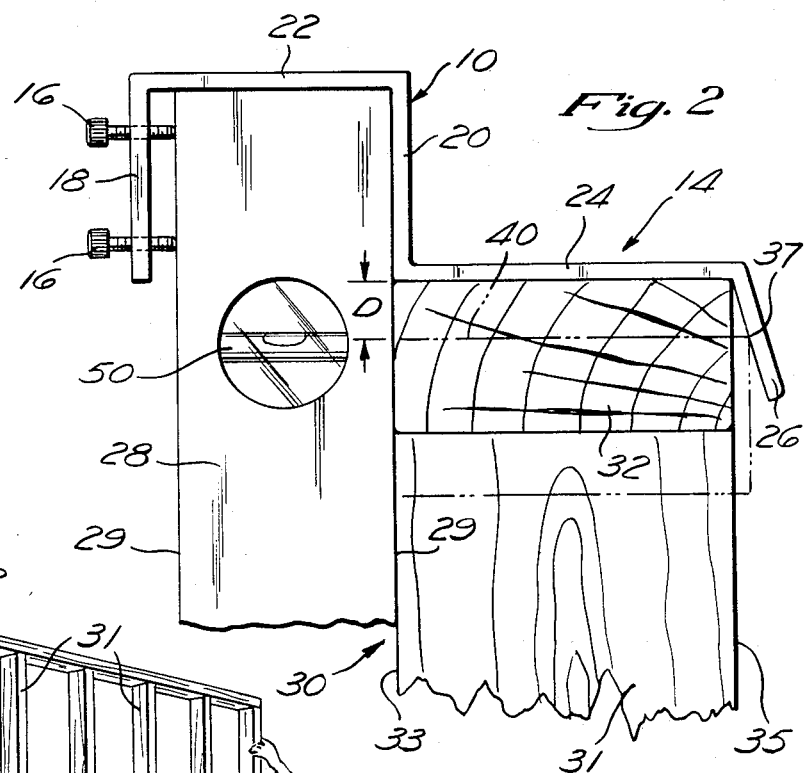
FIG. 2 shows the device with the carpenter's level positioned on the top of a wall partition header.

Referring to FIG. 2, the use of the holder 10 and the manner in which the same utilized on a wall partition is illustrated. As is conventional, the wall partition 30 is formed having a plurality of vertically extending studs or beams 31 which are interconnected by a horizontally extending header 32 typically both formed of 2"×4" constructed timber. As will be apparent, the unique design of the U-shaped portion 12 in accomodating the carpenter's level 28 not only accurately positions the carpenter's level 28 in the carpenter's level holder 10, but provides for the precise placement of the carpenter's level 28 on the vertical surface of the wall partition 30. In addition, the length and position of the carpenter's level 28 in relation to and in combination with the L-shaped portion 14 provides for automatic attachment of the present invention to the wall partition 30.

As shown in FIG. 2, the carpenter's level holder 10 with carpenter's level 28 mounted therein, may be rested upon the header 32 of the wall partition 30 with the leg 24 of the L-shaped portion 14 resting flush in a generally contiguous orientation with the top surface of the header 30. Due to the leg 20 being disposed at a right angle to the leg 24 positioned in such a manner, both sides 29 of the level 28 will be disposed in planes parallel to the planes of the edges 33 and 35 of the studs 31. Typically the width of the header 32 is equal to or slightly less than the length of the longer side 24 of the L-shaped portion 14 such that the lower surface 24 remains flush with the top surface of the header 32. However, should the width of the header 32 of the wall partition 30 be greater than the length of the leg 24 of the L-shaped portion 14, it can easily be seen that the uniqueness of the angular orientation design of the shorter leg 26 of the L-shaped portion 14 will permit the carpenter's level holder 10 to be placed on the header 32 while still maintaining a parallel relationship between the level 28 and the edges 33 and 35 of the studs 31. This beneficial result is made possible by the inner surface of the angular extending leg 26 camming against the upper edge 37 of an oversized header (indicated by the phantom lines in FIG. 2) which will cause the lower surface of the leg 24 to be elevated through a short distance "D" above the top surface 40 of the oversized header. Due to the weight of the level 28 being substantial and cantilevered outboard of the leg 26, a moment force scizzor action is developed which effectively locks the device 10 in its illustrated position such that the edge of the level 28 maintains its parallel and contiguous orientation with the edge 33 of the studs 31. Thus, the unique design of the generally L-shaped portion 14 in combination with the design of the U-shaped portion 12 provides for the automatic and accurate positioning of the carpenter's level 28 in place on the wall partition 30 regardless of varying widths of the header 32.

Figure 3:
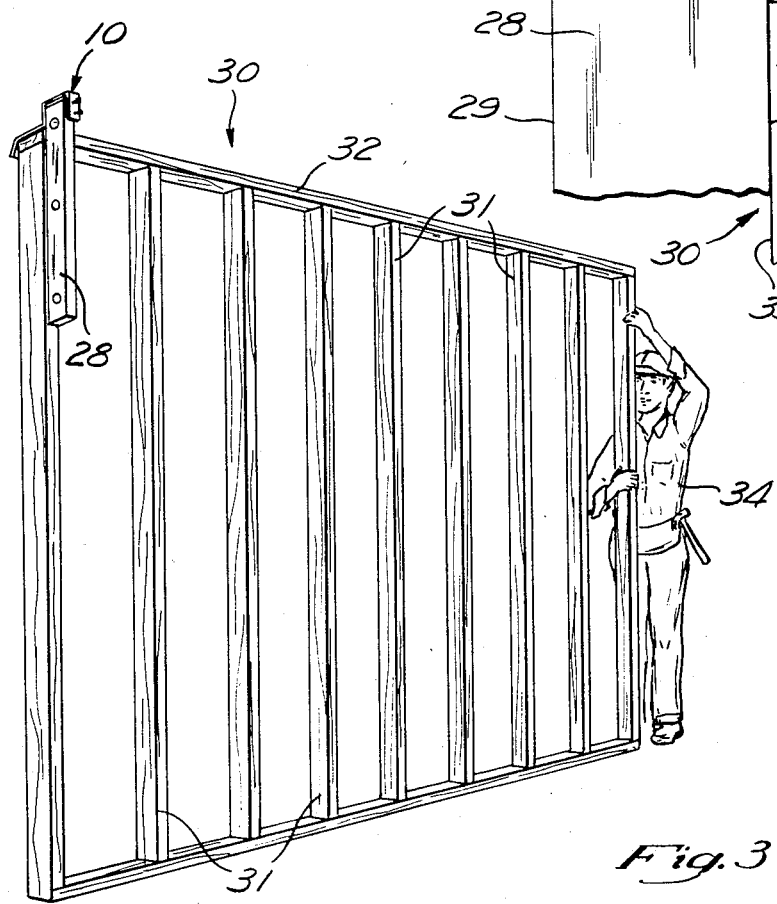
FIG. 3 depicts the method of the present invention illustrating the holder and level in place as the user is positioning the wall partition prior to securing.

Referring to FIG. 3, the method by which the carpenter's level holder 10 is used to permit the positioning plumbing and securing of a wall partition 30 by a single user 34 is illustrated. Once the wall partition 30 has been fabricated in a horizontal position on for instance, the floor, said partition 30 is manually raised in a conventional manner to a near-vertical position as shown. The carpenter's level holder 10 with the level 28 mounted thereon is then placed on the header 32 of the wall partition 30 with the leg 26 of the L-shaped portion 14 extending over the back edge of the header 30 and the leg 24 typically lying in a contiguous orientation with the top surface of the header 30. Due to the weight of the level 28 being cantilevered outward of the header 30, a moment force is generated which continuously serves to urge the edge 29 of the level 28 tightly against and in a parallel orientation to the edge 33 of the studs 31. As such, the level 28 is self-registered to the partition 30 merely by resting the device 10 upon the header 30 and maintained thereon due to the continuously acting moment force without the need for use of auxiliary clamps or fasteners. Since the carpenter's level 10 is self-registering and self-affixed to the partition 30, the individual user 34 is now free to simultaneously hold the wall partition 30 in place, observe the site 50 of the carpenter's level 28 to obtain the true vertical position or plumb of the wall partition 30, and to temporarily secure the wall position in place by way of conventional nailing of a support beam to the wall partition.

Those skilled in the art will recognize that although the invention is designed for standard 2"×4" construction timber, the same can be utilized for other size standard construction timber such as 2"×6" or conventional metal stud construction techniques without departing from the spirit of the present invention.

What is claimed is:

1. A method to plumb and secure a wall partition comprising:

securing a carpenter's level in a bracket having a first portion sized to mount said level and a second portion extending in a direction perpendicular to said first portion adapted to attach said bracket to the wall partition;

placing said second portion of said bracket in a generally contiguous orientation to the header of said wall partition to self-maintain said level upon the wall partition in a plane parallel to the vertical plane of the wall partition;

adjusting the vertical position of the wall partition by use of the site of said carpenter's level; and anchoring said wall partition in said adjusted position.

2. A carpenter's level holder device comprising:

a bracket having a generally U-shaped portion sized to receive one end of a carpenter's level and a generally L-shaped portion extending in a direction perpendicular to said U-shaped portion, said L-shaped portion sized to rest in a generally contiguous orientation with a header of a wall partition to maintain a carpenter's level carried by said bracket in a parallel orientation to the stud timbers of the wall partition without the use of auxiliary clamping means.

3. The device of claim 1 further comprising means for securing the carpenter's level within said U-shaped portion.

4. The device of claim 3 wherein said L-shaped portion includes an angularly extending leg adapted to accomodate differing widths of header on said wall partition.

5. A device to be used for plumbing a wall partition comprising:
a carpenter's level;
a bracket having a first portion adapted to mount one end of said carpenter's level and a second portion extending generally perpendicular to said first portion adapted to be placed upon a header board of the wall partition, said first and second portions of said bracket being oriented relative one another to generate a moment force about the header board when said bracket is rested upon said header board to continuously maintain said carpenter's level in a plane parallel to the vertical plane of said wall partition.

6. The device of claim 5 wherein said first portion comprises a generally U-shaped member and said second portion comprises a generally L-shaped member.

7. The device of claim 6 further comprising means for releasably mounting said carpenter's level to said U-shaped member.

8. The device of claim 7 further comprising means formed on said L-shaped member for accomodating differing sized header timbers of said wall partition.

* * * * *